United States Patent
Lowder et al.

(10) Patent No.: US 7,044,694 B2
(45) Date of Patent: May 16, 2006

(54) ROUTER BIT WITH POSITION STOP

(75) Inventors: Jeremy A. Lowder, Boone, NC (US); Thomas Curtis Parker, Wilkesboro, NC (US); Robert William Yeager, Purlear, NC (US); Russell Eugene Cook, West Jefferson, NC (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/932,541

(22) Filed: Sep. 2, 2004

(65) Prior Publication Data

US 2005/0053441 A1     Mar. 10, 2005

Related U.S. Application Data

(60) Provisional application No. 60/501,491, filed on Sep. 8, 2003.

(51) Int. Cl.
*B23C 1/20* (2006.01)
*B23C 5/00* (2006.01)

(52) U.S. Cl. ............ 409/180; 409/218; 409/229; 407/40; 144/241; 144/145.3; 144/253.3; 144/230; 144/136.95; 279/156

(58) Field of Classification Search .......... 409/180, 409/228–229, 182, 232, 234, 218, 138; 407/53–54, 407/47, 34, 40; 144/241, 218, 228, 145.3, 144/253.3, 230, 154.5, 136.95; 33/639, 636, 33/637, 634; 279/156; 408/186, 241 S See application file for complete search history.

(56) References Cited

U.S. PATENT DOCUMENTS

| | | | | |
|---|---|---|---|---|
| 1,459,534 A | * | 6/1923 | Hilker | 144/253.1 |
| 3,196,749 A | * | 7/1965 | Zanni | 409/180 |
| 3,289,717 A | * | 12/1966 | Dutot | 144/134.1 |
| 4,243,348 A | * | 1/1981 | Paige | 408/186 |
| 4,252,481 A | * | 2/1981 | Krieg | 408/229 |
| 4,669,923 A | * | 6/1987 | McKinney | 407/34 |
| D293,914 S | * | 1/1988 | Hudson | D15/139 |
| 5,044,843 A | * | 9/1991 | Velepec | 409/126 |
| 5,116,166 A | * | 5/1992 | Rinas | 407/57 |
| D338,678 S | * | 8/1993 | Mihic | D15/140 |

(Continued)

*Primary Examiner*—Erica Cadugan
(74) *Attorney, Agent, or Firm*—Sand & Sebolt (57) ABSTRACT

A router bit with a position stop is disclosed. The router bit includes a body with a collar extending outwardly from it and a shaft extending outwardly from the collar. At least one cutter blade is mounted to the body and the cutter blade may be used to cut a profile into a workpiece. The collar has a first diameter, the shaft has a second diameter and the first diameter is larger than the second diameter. The collar has a face formed a spaced distance or height from the transition point between the collar and the body. The face rests against the upper surface of a chuck when the shaft is secured in the chuck. This allows the body and hence the cutter blades to be held a predetermined distance above the upper surface of the chuck. A second router bit may be provided to cut a complimentary second profile in a second workpiece. The second router bit includes a collar that positions the cutter blade of the second router bit in the chuck at a complimentary height with respect to the cutter blade of the first router bit. When the first and second workpieces are brought together, the profiles of the two workpieces are able to interlock in such a way that the workpieces are both functionally and aesthetically aligned with each other.

21 Claims, 6 Drawing Sheets

U.S. PATENT DOCUMENTS

| | | | | |
|---|---|---|---|---|
| 5,267,593 A | * | 12/1993 | Patterson | 144/135.2 |
| 5,593,253 A | * | 1/1997 | Pozzo | 407/36 |
| 5,615,718 A | * | 4/1997 | Venditto | 144/135.2 |
| 5,647,700 A | * | 7/1997 | Velepec | 407/34 |
| 5,810,517 A | * | 9/1998 | Bostic | 407/53 |
| 6,048,142 A | * | 4/2000 | Hashimoto et al. | 29/888.022 |
| D434,783 S | * | 12/2000 | Reichenthal | D15/139 |
| D477,516 S | * | 7/2003 | Dollar et al. | D8/70 |
| D479,457 S | * | 9/2003 | Dollar et al. | D8/70 |
| 6,729,814 B1 | * | 5/2004 | Dollar et al. | 409/234 |
| 6,808,343 B1 | * | 10/2004 | Dollar et al. | 409/182 |
| 6,817,813 B1 | * | 11/2004 | Dollar et al. | 408/240 |
| 2003/0072624 A1 | * | 4/2003 | Dollar et al. | 407/30 |
| 2003/0072626 A1 | * | 4/2003 | Dollar et al. | 408/1 R |
| 2004/0091330 A1 | * | 5/2004 | Dollar et al. | 408/239 R |

* cited by examiner

ROUTER BIT WITH POSITION STOP

BACKGROUND OF THE INVENTION

1. Technical Field

This invention generally relates to router bits. More particularly, the invention relates to a router bit having a mechanism for setting the position of the cutter blades relative to the upper surface of a chuck in a rotary tool. Specifically, the invention relates to a router bit having a body and shank, where the shank includes a collar adapted to rest on the upper surface of the chuck and to thereby maintain the cutter blades of the router bit at a set distance from the upper surface of the chuck.

2. Background Information

Routers are used for a variety of woodworking purposes including cutting of complimentarily shaped profiles such as tongue and groove joints, finger joints and the shaped edges of a table and leaf for a drop-leaf table. In order to cut such complimentarily shaped profiles, a first router bit is attached to the router by inserting the shank of the bit into the bore of a chuck on the router. The shank is locked into place by tightening the collet in the chuck and the tool is then brought into contact with a first workpiece, such as a piece of wood or plastic. The first router bit is then rotated by the router motor so that a first profile is cut into the first workpiece. The operator then removes the first router bit and a second router bit is inserted and secured to the router. The second router bit is of a different cutting configuration to the first router bit. The second router bit is rotated and brought into contact with a second workpiece. The second router bit cuts a second profile into the workpiece. The first and second profiles are complimentarily shaped and are adapted to enable the first and second workpieces to be brought into in interlocking engagement.

One of the most common problems experienced by carpenters or other users when performing this task is that the first and second router bits must be inserted into the collet to exactly the same degree so that the depth of the cuts in the two workpieces matches exactly. If this is not achieved, then when the two profiles are brought together to interlock with each other, one workpiece will tend to be slightly vertically displaced relative to the other. This causes the interlock of the two workpieces to be either aesthetically displeasing or nonfunctional.

A second problem experienced by carpenters or users when using presently known router bits is that the bits tend to vibrate quite a lot and this makes precision work with the router or rotary tool more difficult. Additionally, the router bit may be prone to premature failure because of the combination of vibration in the router bit and the force exerted on the bit by the user during cutting.

There is therefore a need in the art for a mechanism for ensuring that a router bit may be inserted into the collet of a router at a predictable depth. There is furthermore a need in the art for a mechanism for ensuring that complimentarily shaped router bits may be inserted into a router at a predictable and substantially constant depth. There is also a need in the art for a router bit that vibrates less during cutting and that is less prone to premature failure.

SUMMARY OF THE INVENTION

The router bit of the present invention includes a body and a shank. The shank has a wider upper portion that is adapted to engage the upper surface of a router chuck and a narrower, lower portion that is adapted to be received within the bore of the router chuck.

The preferred embodiments of the invention, illustrative of the best mode in which applicant has contemplated applying the principles, are set forth in the following description and are shown in the drawings and are particularly and distinctly pointed out and set forth in the appended claims.

DETAILED DESCRIPTION OF THE INVENTION

Figure 1:
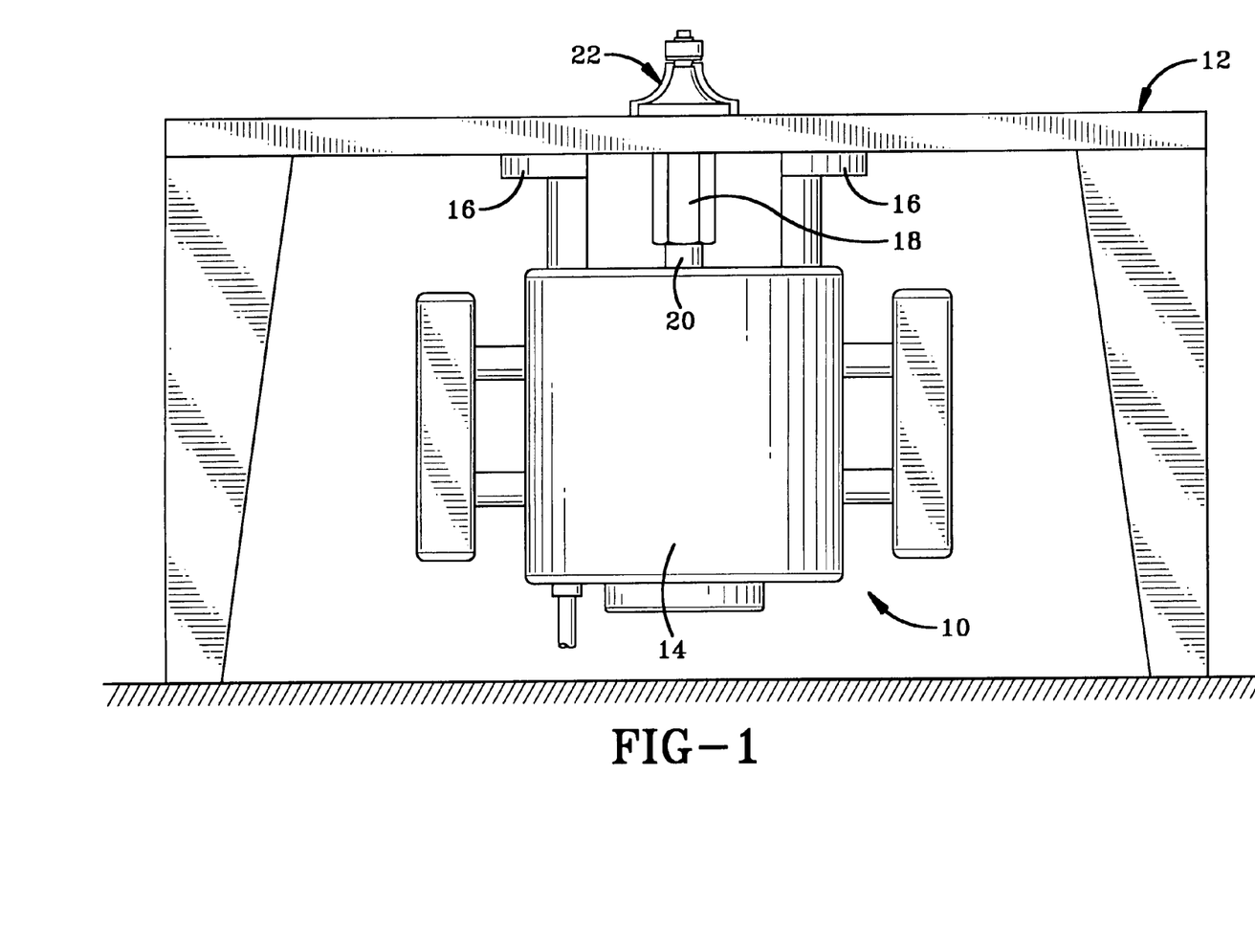
FIG. 1 is a side view of a router bit of the present invention attached to a router mounted in a router table.
Figure 2:
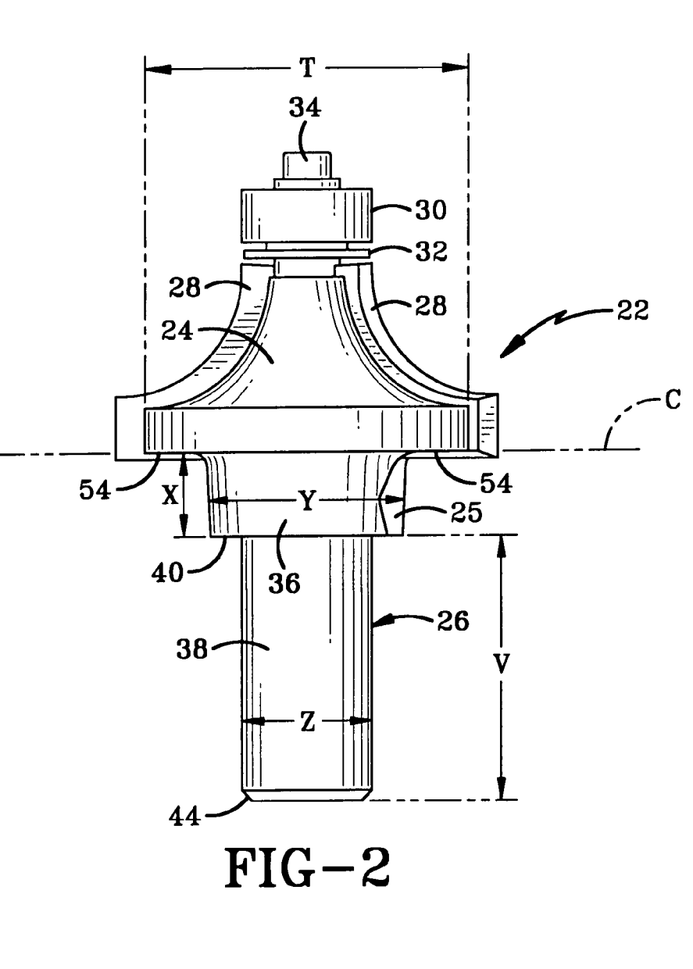
FIG. 2 is a first side view of the router bit of the present invention.
Figure 3:
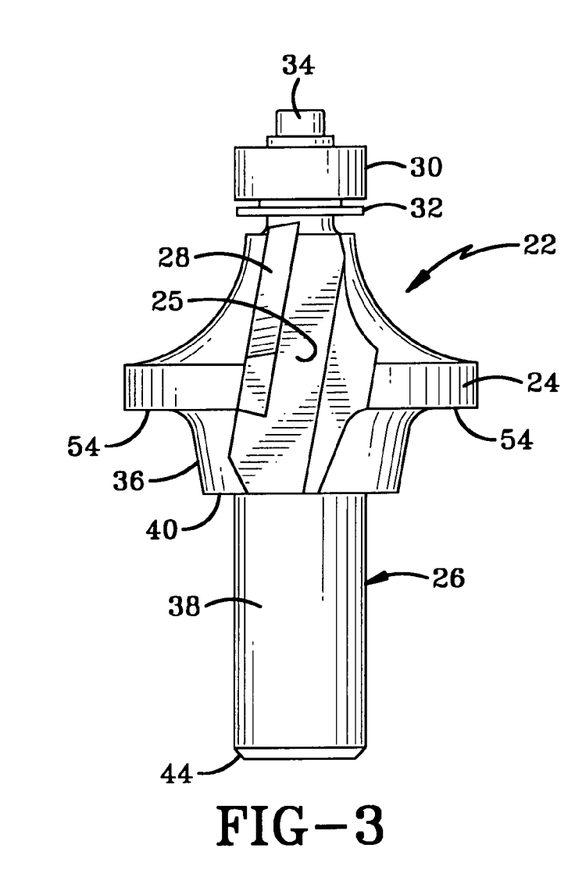
FIG. 3 is a second side view of the router bit.
Figure 4:
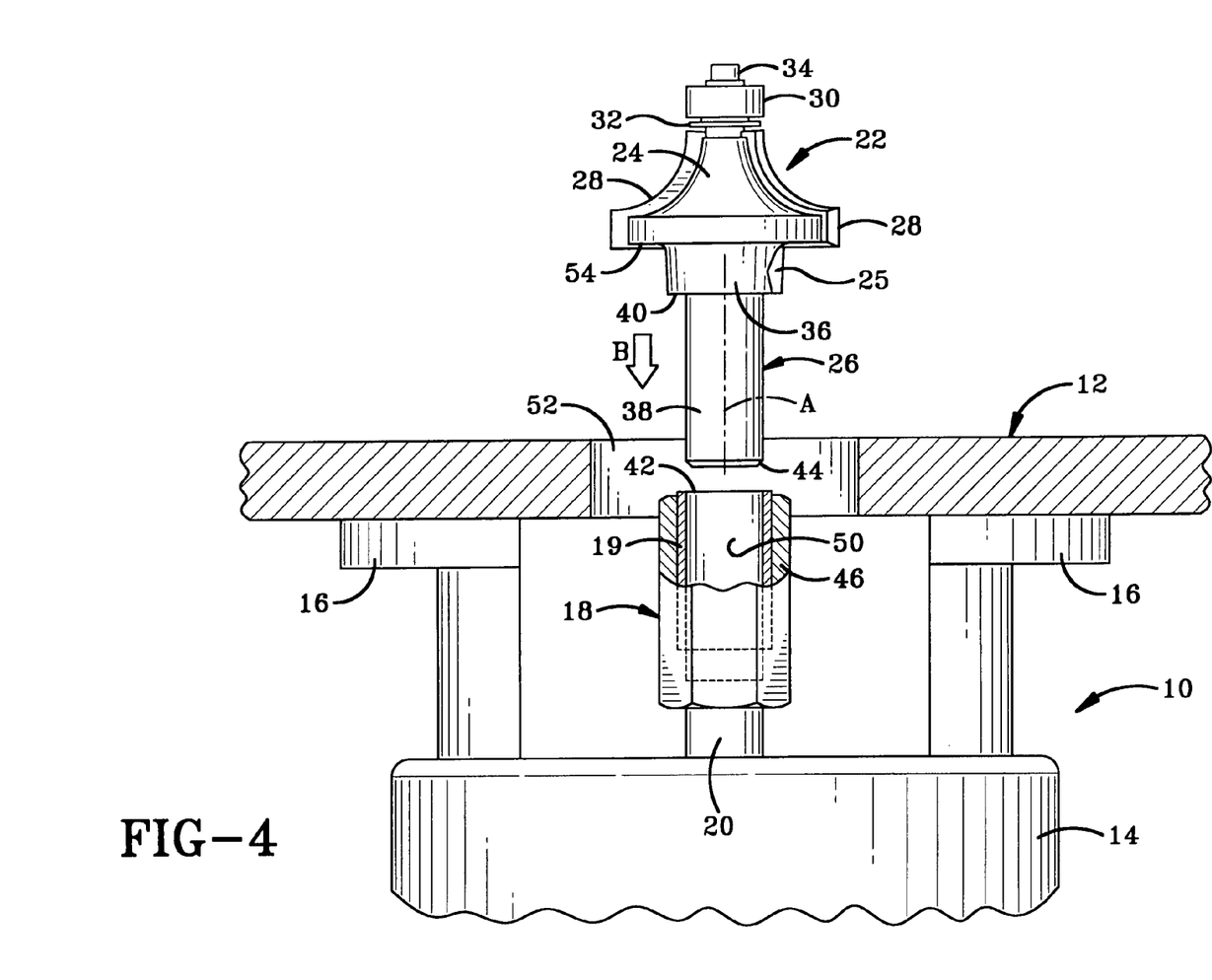
FIG. 4 is a partial cross-sectional side view showing the router bit being inserted into a collet of a router that is mounted in a router table.
Figure 5:
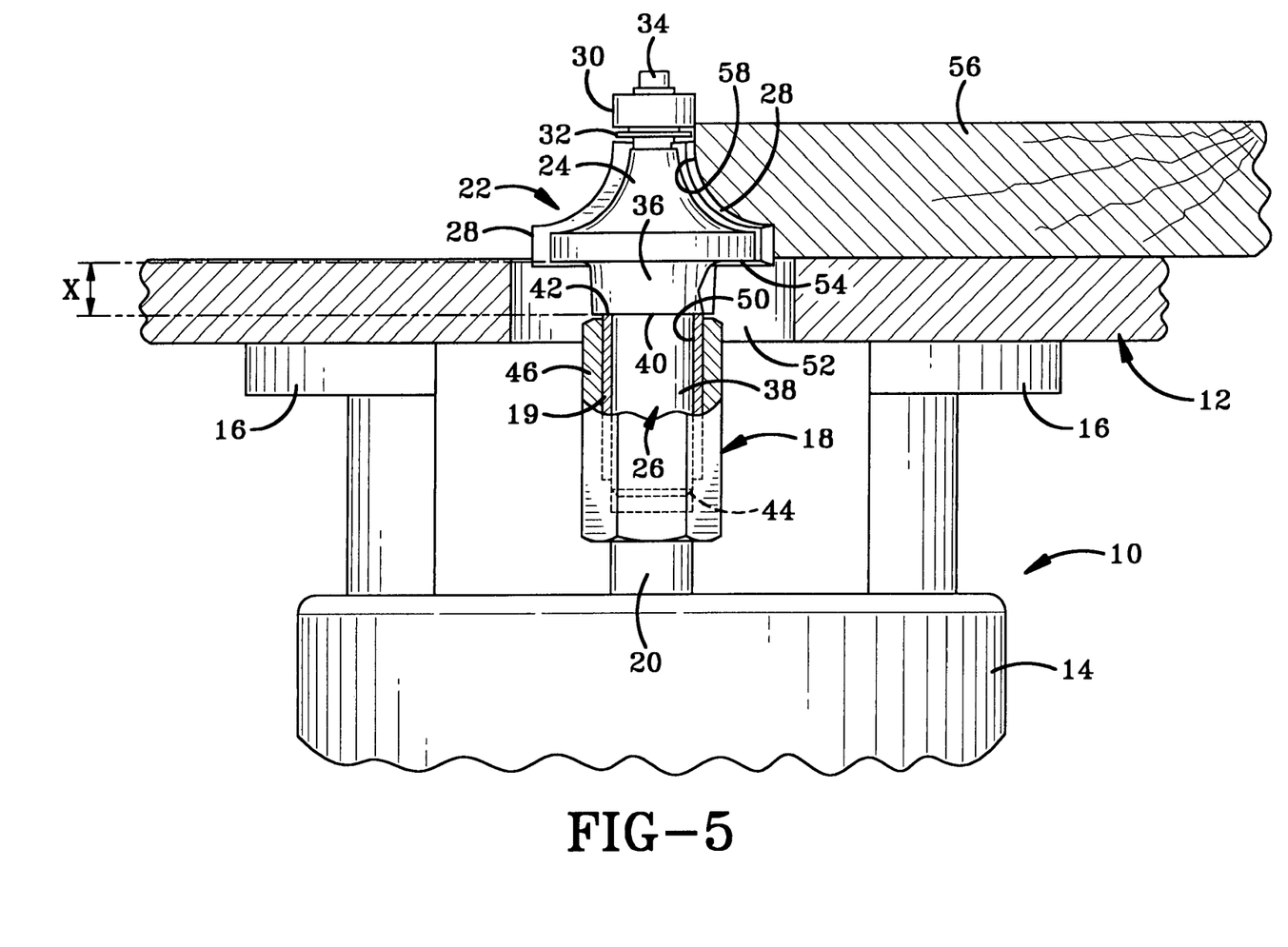
FIG. 5 is a partial cross-sectional side view showing the router bit cutting into a piece of wood.

FIGS. 1 shows a plunge router 10 mounted on a router table 12. Router 10 has a router body 14 and a router base 16. Router base 16 is secured to table 12 by suitable means such as nuts and bolts (not shown). A router bit 22 in accordance with the present invention is connectable to router 10 by way of a chuck 18. While the following description pertains to a plunge router 10 mounted on a router table 12, it will be understood by those skilled in the art that the router bit of the present invention may be used with any type of rotary tool without departing from the spirit of the present invention.

Referring to FIGS. 2–5, router bit 22 comprises a body 24 with a shank 26 extending therefrom. Shank 26 has a collar section 36 and a shaft section 38 with collar 36 extending outwardly from body 24 and shaft 38 extending outwardly from collar 36. Body 24 and shank 26 are preferably integrally formed, with body 24 presenting at least one cutter edge or blade 28. Preferably, one pair of diametrically opposed cutter blades 28 are secured to body 24. Body 24 and shank 26 may be manufactured from a material such as steel, while cutter blades 28 may be manufactured from carbide or some other suitable wear-resistant material. Body 24 and collar 36 may include a channel 25 through which cuttings from a workpiece may drop and therefore be removed away from cutter blades 28. Channel 25 may extend at least partially into collar 36 adjacent each cutter blade 28. Preferably, channel 25 extends the entire height X of collar 36. A roller guide bearing 30 and dustshield 32 are secured to the upper end body 24 by a screw 34. Roller guide bearing 30 is able to rotate independently of body 24 and shank 26. As may be most clearly seen in FIGS. 4 & 5, chuck 18 of router 10 is generally cylindrical, having an outer wall 46 and a coaxial inner collet 19. Chuck 18 defines a bore 50 into which the shaft 38 is adapted to be inserted. When shaft 38 is inserted into bore 50, collet 19 is engaged to lock shaft 38 in chuck 18. When the cutter bit 22 is secured in chuck 18, body 24 and shank 26 rotate together as a unit.

Body 24 has a diameter T, not including cutter blades 28, and has an axis of rotation A. Collar 36 has a height X and a diameter Y. Shaft 38 has a height V and a diameter Z. It will be seen that the diameter Y of collar 36 is greater than the diameter Z of both shaft 38 and bore 50. The diameter Y of collar 36 may be smaller than the diameter T of body 24, but there may, however, be instances where it is desirable that the diameter T of the body is less than or equal to the diameter Y of collar 36. Collar 36 is connected to body 24 at a transition point, shown at line C. A shoulder 54 is formed between the body 24 and collar 36 at transition point C if the diameter Y of collar 36 is different to the diameter of the body 24. The height X is the distance between shoulder 54 and the face 40 of collar 36. The height X of collar 36 is smaller than height V of shaft 38. In the attached figures, the height X of collar 36 is about ⅓ of the height of shaft 38. However, collar 36 may have any height X that is suitable for the purposes to which the bit 22 is to be used. The end 44 of shaft 38 is preferably beveled or narrowed to facilitate easy insertion of shaft 38 into chuck 18. When shaft 38 is received in bore 50, face 40 engages the upper surface 42 (FIG. 4) of chuck 18.

Figure 7:
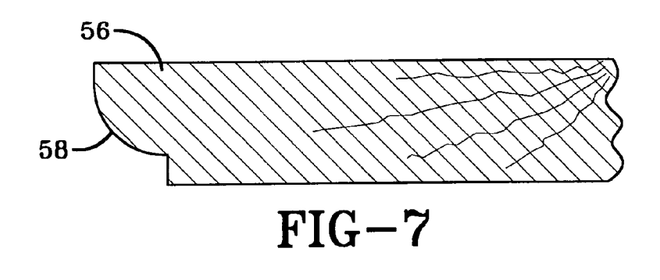
FIG. 7 is a partial cross-sectional side view of a first profile cut into a first piece of wood.

In operation, chuck 18 extends upwardly and partially into an aperture 52 in table 12. Bit 22 is lowered into aperture 52 in the direction of Arrow B until the end 44 of shaft 38 enters bore 50. Bit 22 continues to be moved in the direction of Arrow B until the face 40 of collar 36 rests on the upper surface 42 of chuck 18. Bit 22 is secured into chuck 18 by collet 19. When bit 22 is engaged in chuck 18, the shoulder 54 of body 24 is positioned a height X above the upper surface 42 of chuck 18. This causes cutter blades 28 to be held at a predetermined height above the upper surface 42 of chuck 18. Once bit 22 is locked into chuck 18, a first workpiece 56 is brought into contact with rotating cutter blades 28. Cutter blades 28 cut a first profile 58 into wood 56 as router bit 22 rotates and the first workpiece 56 is moved relative to cutter bit 22. First profile 58 can be more clearly seen in FIG. 7.

Figure 6:
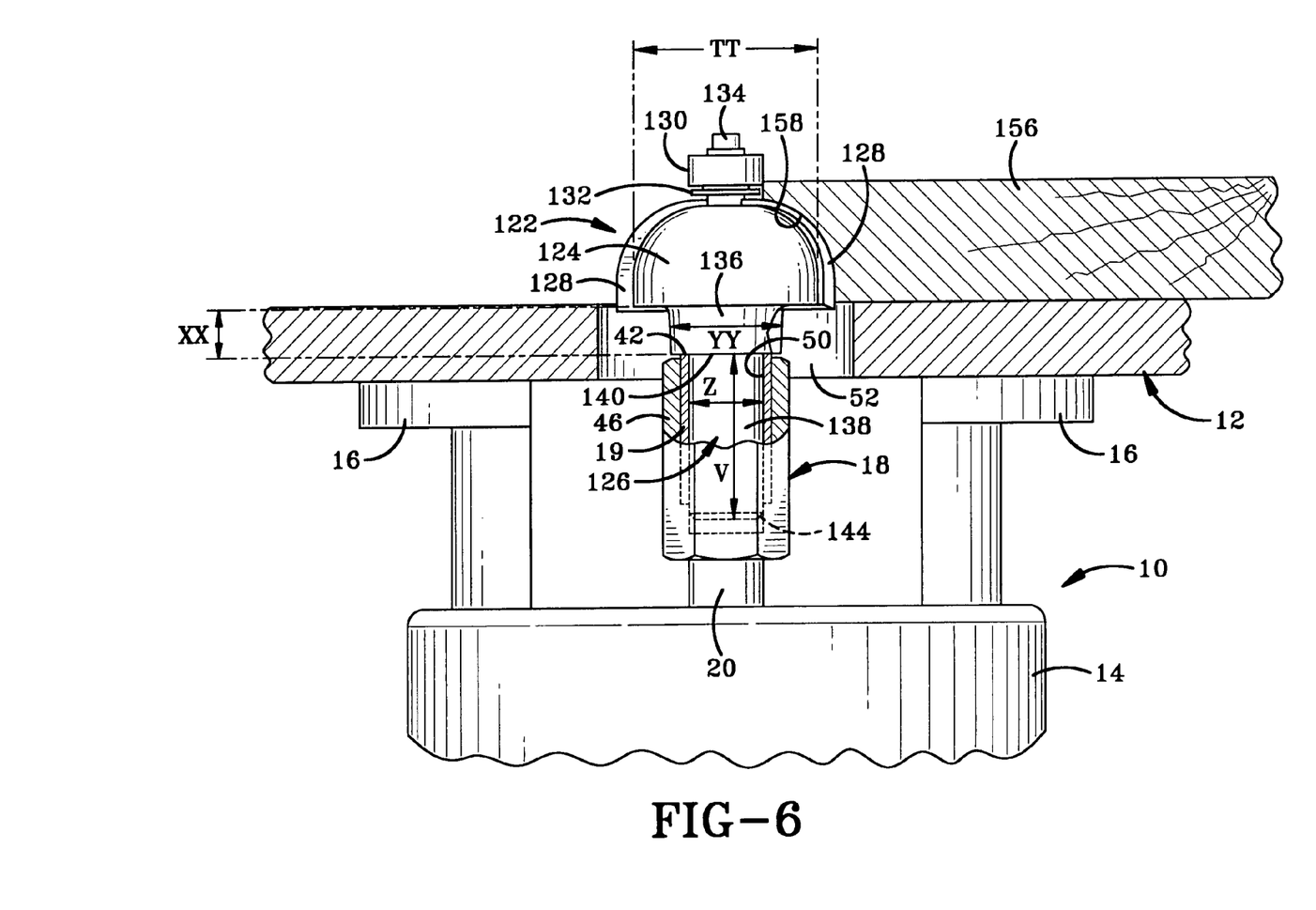
FIG. 6 is a partial cross-section side view of a second embodiment of a router bit in accordance with the present invention showing the router bit cutting a second complimentary profile into a piece of wood.
Figure 8:
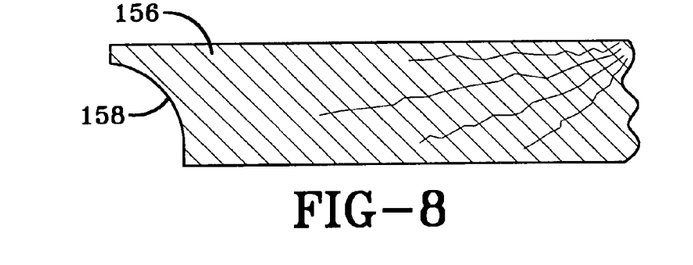
FIG. 8 is a partial cross-sectional side view of a second profile cut into a second piece of wood.

Referring to FIGS. 6 & 8, in order to cut a second profile in a second workpiece so that the second profile is complimentarily shaped to first profile 58, router bit 22 is disengaged from collet 19 and is removed from router 10. A second router bit 122 is then connected to chuck 18. Second router bit 122 comprises a body 124 with a shank 126 extending therefrom. Shank 126 includes a collar 136 that extends outwardly from body 124 and a shaft 138 that extends outwardly from collar 136. Body 124 and shank 126 are preferably integrally formed. At least one, and preferably one pair, of second cutter edges or blades 128 are mounted on body 124. Second cutter blades 128 are configured differently to cutter blades 28 so that a second profile may be cut into a workpiece. It can be seen by comparing FIG. 6 with FIG. 4 that body 124 has a convexly shaped outer configuration whereas body 24 of router bit 22 has a concavely shaped outer configuration. Body 124 and shank 126 may be manufactured from a material such as steel, while second cutter blades 128 may be manufactured from carbide or some other suitable wear-resistant material. A roller guide bearing 130 and dustshield 132 are secured to the upper end of body 124 by a screw 134. Roller guide bearing 130 is able to rotate independently of body 124 and shank 126. Body 124 and shank 126 rotate together as a unit when bit 22 is secured in chuck 18.

Body 124 has a diameter TT, not including second cutter blades 128. Collar 136 has a height XX and a diameter YY. Shaft 138 has a height V and a diameter Z. The diameter YY of collar 136 is greater than the diameter Z of shaft 138. Additionally, the diameter YY of collar 136 is preferably smaller than the diameter TT of body 124, but there may be circumstances in which it is desirable that the diameter TT of body 124 be smaller than or equal to the diameter YY of collar 136. The diameter YY of collar 136 of second bit 122 may be the same as the diameter Y of collar 36 of bit 22 or it may be larger or smaller than the diameter Y of collar 36. It will also be seen that the height XX of collar 136 is smaller than height V of shaft 138, the height XX of collar 136 being about ⅓ of the height of shaft 138. The height XX of collar 136 of second bit 122 is related to the height X of collar 36 of bit 22. Collars 36 and 136 are configured so that the cutters 28, 128 exactly match up when in use. The end 144 of shaft 138 is preferably beveled or narrowed to facilitate easy insertion of shaft 138 into the bore 50 of chuck 18. Collar 136 has a face 140 that engages the upper surface 42 of chuck 18 when bit 122 is engaged in chuck 18. When second bit 122 is engaged in chuck 18, it may be brought into rotational contact with a second workpiece 156. Second bit 122 cuts a second profile 158 in a second workpiece 156. Second profile is complimentarily shaped to the first profile 58 in first workpiece 56.

Figure 9:
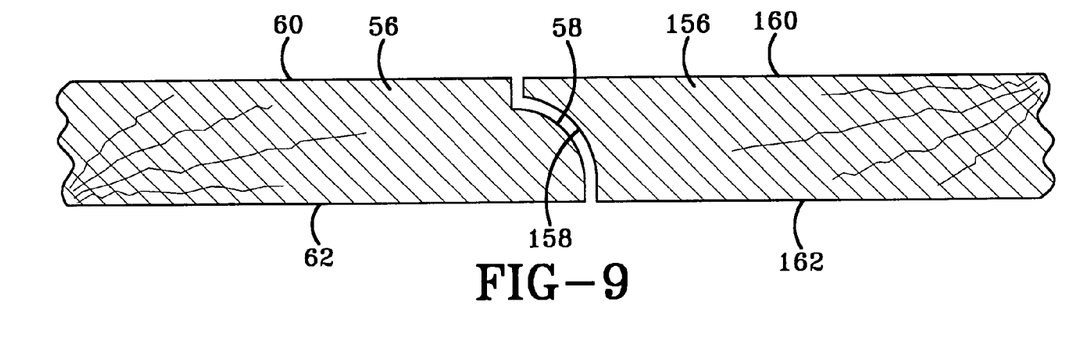
FIG. 9 is a partial cross-sectional side view of the two pieces of wood brought together showing how the first and second profiles interlock with each other.

Referring to FIG. 9, it can be seen that when first and second workpieces 56, 156 are brought together so that first profile 58 and complimentarily shaped second profile 158 are disposed proximate each other, top surfaces 60, 160 of workpieces 56, 156 are aligned with each other. It will also be seen that second surfaces 62, 162 of workpieces 56, 156 are aligned. The profiles 58, 158 match exactly so that the end product is aesthetically pleasing and functionally the two workpieces 56, 156 can interlock with each other.

It will be understood by those skilled in the art that complimentarily shaped pairs of router bits having differently sized collars may be provided without departing from the spirit of the present invention. The pairs of bits have related collar heights that ensure that the cutter blades 28, 128 are configured to cut cooperating profiles in workpieces. The related collar heights allow the carpenter to select the desired depth of cut that they wish to make. Not only does the provision of a particular height of collar on pairs of complimentary bits allow the carpenter to ensure accurate cutting and alignment of complimentarily profiled workpieces, but the provision of a collar 36 of greater diameter than the shaft 38 also tends to add strength to the router bit 22. This added strength assists in preventing premature failure of the part. Additionally, because the face 40 (or 140) of bit 22 (or 122) rests on the upper surface 42 of chuck 18, the router 10 also has more stability and vibrations are dampened. This allows the user to use the router 10 and bit 22 for tasks requiring greater accuracy and precision. The reduction in vibration of bit 22 also tends to increase the life of the bit 22.

Tests were conducted to determine the differences in the stress levels between presently available router bits and the bit 22, 122 of the present invention.

A first stress test was conducted on a standard carbide router bit having a ¼ inch shank. In this test, a maximum stress value of 57,810 inch pound seconds (ips) was found at points along the carbide cutter blade, behind the cutter blade and at the intersection of the body and shank of the bit.

An identical test of a router bit 22 was conducted on a bit 22 having a ¼ inch shank 26 and having cutter blades 28. In this test, a maximum stress value of 24,200 ips was found along the carbide cutter blade, a maximum stress value of 7,500 ips was found at the intersection of the body 24 and collar 36 and of 0.00 ips was found at the intersection of the collar 36 and shaft 38. Tests showed that the addition of collar 36 resulted in a bit 22, with a ¼ inch shank 26, that is approximately twice as safe to use as a standard bit with a ½ inch shank.

A second set of tests was conducted on a standard carbide router bit having a ½ inch shank. In this instance a maximum stress value of 42,800 ips was found along the carbide cutter blades and a stress value of 2,250 ips was found at the intersection of the shank with the body. In a router bit in accordance with the present invention, having a collar 36 and a ½ inch shaft, the same test resulted in a maximum stress value of 17,960 ips on the cutter blades 28 and 0.00 ips at the intersection of both the body 24 with the collar 36 and the collar 36 with the shaft 38. This set of tests showed that a cutter bit 22 in accordance with the present invention, having a collar 36 is approximately 1.5 times safer than a regular ½ inch shank bit.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A router bit comprising:
   a shaft having a diameter and a length and being adapted to be received within a bore of a chuck of a rotary tool such that the entire length of the shaft is received within the bore;
   a body formed integrally with the shaft; and having a first end disposed proximate the shaft and a second end disposed remote from the shaft; said first end of the body having a diameter greater than the diameter of the shaft; and wherein the first end of the body includes a face that abuts an outer surface of the chuck when the shaft is received within the bore of the chuck;
   at least one unobstructed channel formed in the body; said channel originating proximate the second end of the body and terminating in the face of the first end of the body;
   at least one cutter blade mounted on the body adjacent the channel and terminating a spaced distance inwardly away from the face; said at least one cutter blade being adapted to cut a profile into a workpiece; whereby material cut from the workpiece is at least partially removed through the channel.

2. The router bit of claim 1, further comprising a roller guide bearing rotatably mounted to the body.

3. The router bit of claim 2, wherein the roller guide is mounted on the body so that the body lies intermediate the roller guide and the shaft.

4. The router bit of claim 1, wherein the second end of the body has a second face that is disposed remote from the shaft and substantially parallel to the face of the first end of the body; and wherein the at least one channel extends between the face of the first end of the body and the second face.

5. The router bit of claim 4, wherein the at least one first cutter blade has a first end and a second end; and the first end is disposed proximate a face of the body and the second end is disposed a spaced distance inwardly from the face of the first collar.

6. The router bit of claim 1, wherein the face of the body is substantially planar.

7. In combination, a router, a first router bit and a second router bit, the combination comprising:
   (a) a router having:
       a drive shaft driven by the motor;
       a chuck connected to the drive shaft and having an upper surface and defining a bore therein;
   (b) a first router bit selectively connectable to the chuck, the first router bit having:
       a first body having at least a first diameter;
       at least one first cutter blade mounted on the first body, the at least one first cutter blade having a first configuration and being adapted to cut a first profile into a first workpiece;
       a first collar extending outwardly from the first body and having a second diameter;
       a first shaft extending outwardly from the first collar and having a third diameter, the third diameter being smaller than both the first and second diameters;
       a first face disposed on the first collar a spaced distance from the first body and thereby defining a first height between the first body and the first face; and
       wherein the first shaft is received into the bore of the chuck; and when the first shaft is so received, the first face of the collar abuts the upper surface of the chuck; whereby the entire first shaft is received within the bore of the chuck;
   (c) a second router bit selectively connectable to the chuck, the second bit comprising:
       a second body;
       at least one second cutter blade mounted on the second body, the at least one second cutter blade having a second configuration and being adapted to cut a second profile into a second workpiece; said at least one second cutter blade being complementary in configuration to the at least one first cutter blade;
       a second collar extending outwardly from the second body and having a fourth diameter;
       a second shaft extending outwardly from the second collar and having a fifth diameter, the fifth diameter being smaller than the fourth diameter;
       a second face disposed on the second collar a spaced distance from the second body and thereby defining a second height between the second body and the second face; and
       wherein the second shaft is received into the bore of the chuck; and when the second shaft is so received, the second face of the second collar abuts the upper surface of the chuck; whereby the entire second shaft is received within the bore of the chuck;
   and wherein the first and second heights of the first and second cutter blades complementary when the first and second collars of the first and second router bits abut the chuck, such that the first and second profiles cut into the first and second workpieces are alignable; and the first and second workpieces are alignable.

8. The combination of claim 7, wherein the first and second heights of the first and second collars are equal.

9. The combination of claim 7, wherein each of the first and second shafts has a tapered terminal end.

10. The combination of claim 7, wherein the first body, first collar and first shaft of the first router bit is integrally formed; and the second body, second collar and second shaft of the second router bit is integrally formed.

11. The combination of claim 7, further comprising a roller guide bearing rotatably mounted to at least one of the first body and second body.

12. The combination of claim 7, wherein the first body of the first router bit includes a channel proximate the at least one first cutter blade.

13. The combination of claim 12, wherein the channel extends from the first body and into the first collar, terminating in the first face thereof.

14. In combination:
(a) a router having:
a motor;
a drive shaft driven by the motor;
a chuck connected to the drive shaft and having an upper surface and defining a bore therein;
(b) a first router bit selectively connectable to the chuck, the router bit having:
a first body with an end surface;
at least one first cutter blade mounted on the first body adjacent a channel, the at least one first cutter blade having a first configuration and being adapted to cut a first profile into a first workpiece;
a first collar extending away from the end surface and having a first diameter; the first collar including a face disposed a spaced distance from the end surface, and having a first height between the face and the at least one first cutter blade;
the channel formed in the first body and extending into the first collar, said channel terminating in the face of the first collar;
a shaft extending away from the face of the first collar; the shaft having a second diameter that is smaller than the first diameter of the first collar; said shaft being adapted to be received within the bore of the router, and when the shaft is so received, the face of the first collar abuts the upper surface of the chuck;
(c) a second router bit selectively connectable to the chuck, the second router bit comprising:
a second body having a second end surface:
at least one second cutter blade mounted on the second body; the at least one second cutter blade having a second configuration and being adapted to cut a second profile into a second workpiece; said second profile being complementary in shape to said first profile;
a second collar extending away from the second end surface and having a third diameter; the second collar including a second face disposed a second distance from the second end surface; and having a second height between the second face and the second cutter blade;
a second shaft extending away from the second face and having a fourth diameter, the fourth diameter being smaller than the third diameter; said second shaft being adapted to be received within the bore of the router, and when the second shaft is so received, the second face of the second collar abuts the upper surface of the chuck;
and wherein the first and second heights of the respective at least first and at least second cutter blades are complementary when the respective first and second collars abut the upper surface of the chuck; whereby the first and second profiles cut into the first and second workpieces are interlocking alignable with each other.

15. In combination, a router and a first router bit, wherein:
the router includes:
a motor;
a drive shaft operationally connected to the motor;
a chuck operationally connected to the drive shaft, and wherein the chuck defines a bore therein and includes an outer surface; and
the first router bit comprises:
a shaft having a diameter and a length, the shaft being selectively received within the bore of the chuck such that the entire length of the shaft is received within the bore;
a body formed integrally with the shaft; the body having a first end disposed proximate the shaft and a second end disposed remote from the shaft, the first end of the body having a first diameter that is greater than the diameter of the shaft; and wherein the first end of the body includes a face that abuts the outer surface of the chuck when the shaft is received within the bore;
at least one unobstructed channel formed in the body and originating proximate the second end of the body and terminating in the face thereof;
and wherein the router bit further includes at least one cutter blade mounted on the body and adjacent the at least one channel therein; the at least one cutter blade terminating a spaced distance inwardly from the face, the at least one cutter blade being adapted to cut a profile into a workpiece.

16. The combination of claim 15, wherein the face of the body is substantially planar.

17. The combination of claim 15, further comprising a roller guide bearing mounted on the body so that the body lies intermediate the roller guide bearing and the shaft.

18. The combination of claim 15, further comprising a second router bit;
and wherein the second router bit has;
a second shaft having a second length and a second diameter and being selectively received within the bore of the chuck such that the entire second length of the second shaft is received within the bore;
a second body formed integrally with the second shaft; the second body having a first end disposed proximate the second shaft and a second end disposed remote from the second shaft, the first end of the second body having a diameter that is greater than the second diameter of the second shaft; and wherein the first end of the second body includes a second face that abuts the outer surface of the chuck when the second shaft is received within the bore; the second body further defining at least one unobstructed groove originating proximate the second end of the second body and terminating in the second face;
and wherein the second router bit further includes at least one second cutter blade mounted on the second body and adjacent the at least one groove therein; the at least one second cutter blade terminating a spaced distance inwardly from the second face, and being adapted to cut a second profile into a second workpiece.

19. The combination of claim 18, wherein the second face of the second body is substantially planar.

20. The combination of claim 18, further comprising a second roller guide bearing mounted on the second body so that the second body lies intermediate the second roller guide bearing and the second shaft.

21. A router bit comprising:

a shaft adapted to be received entirely within a bore of a chuck of a rotary tool; and wherein the shaft has a diameter;

a body integrally formed with the shaft; wherein the body comprises three regions including:

a first region immediately adjacent the shaft and being of a first diameter that is greater than the diameter of the shaft; and wherein the first region has a face from which the shaft extends; and the face abuts an upper surface of the chuck when the shaft is inserted into the bore;

a second region immediately adjacent the first region and being of a second diameter, and wherein the second diameter is greater than the first diameter;

a third region immediately adjacent the second region; and wherein the third region tapers in diameter and terminates in an end wall;

a cutter blade mounted on the body and terminating a spaced distance from the face; and an unobstructed channel formed in the body and terminating in the face.

\* \* \* \* \*

UNITED STATES PATENT AND TRADEMARK OFFICE
CERTIFICATE OF CORRECTION

PATENT NO. : 7,044,694 B2
APPLICATION NO. : 10/932541
DATED : May 16, 2006
INVENTOR(S) : Lowder et al.

It is certified that error appears in the above-identified patent and that said Letters Patent is hereby corrected as shown below:

Column 6, line 8 insert "a motor" after "a router having" - - a router having a motor:

Signed and Sealed this

Twenty-second Day of August, 2006

JON W. DUDAS
*Director of the United States Patent and Trademark Office*